April 15, 1969 T. G. MARSHALL 3,439,291

LADDER NETWORK FILTER HAVING A NEGATIVE RESISTANCE TO COMPENSATE FOR LOSSY REACTIVE COMPONENTS IN THE FILTER

Filed March 30, 1966 Sheet 1 of 3

INVENTOR.
THOMAS G. MARSHALL

BY Edward J. Norton
Attorney

INVENTOR.
THOMAS G. MARSHALL
BY
Edward J. Norton
Attorney

INVENTOR.
THOMAS G. MARSHALL
BY
Edward J. Norton
Attorney

United States Patent Office 3,439,291

Patented Apr. 15, 1969

3,439,291

LADDER NETWORK FILTERS HAVING A NEGATIVE RESISTANCE TO COMPENSATE FOR LOSSY REACTIVE COMPONENTS IN THE FILTER

Thomas G. Marshall, Princeton, N.J., assignor to Radio Corporation of America, a corporation of Delaware Filed Mar. 30, 1966, Ser. No. 538,852
Int. Cl. H01p 5/12
U.S. Cl. 333—6 7 Claims

ABSTRACT OF THE DISCLOSURE

A ladder network filter employing lossy reactive components, but having a frequency characteristic and insertion loss equivalent to that of a ladder network filter employing lossless known reactive elements, is achieved by incorporating in the terminating branch at at least one end of the filter a negative resistance of that certain particular value which results in a negative branch dissipation constant equal to the sum of the positive branch dissipation constants of all the branches which is caused by the lossy reactive elements thereof. Further, the individual value of the reactances forming each respective branch of the filter is individually determined in accordance with a matrix which is a function of the respective net dissipation constant of every particular branch of the filter, made up of all positive and negative dissipation constants components of each respective branch, and the known lossless reactances of the equivalent filter. Also covered is a filter array composed of a plurality of such filters each having one terminating branch thereof coupled to a common input terminal and utilizing a single negative resistance having the proper value to compensate for the lossiness of the reactance elements employed in the respective branches of all the respective filters making up the array, while providing a frequency characteristic for each filter making up the array equivalent to that of a corresponding ideal filter utilizing known lossless reactive elements.

This invention relates to negative resistance circuits and more particularly to a method and apparatus by which a negative resistance is used to compensate for the effects of losses associated with the reactive elements in a filter.

It is known that one or more negative resistances can be used to advantage in a ladder network such as a filter or frequency sensitive network. For example, the resistive losses associated with an inductor are often cancelled by using a negative resistance whose value is chosen to cancel the positive resistance of the inductor; thereby affording a lossless element. Hence, if one has a large network of inductors and capacitors forming a filter or ladder network, it is possible to cancel out the resistive losses of such components by associating an individual negative resistance of proper value with each individual lossy component. This technique, of course, requires a substantial number of such negative resistance elements to compensate a complex network. Mechanical filters employ components which appear lossless in some applications; however, in other applications, the losses are significant and the foregoing technique is difficult to apply because mechanical negative resistance is, at best, extremely difficult to achieve.

It is an object of the present invention to provide an improved arrangement for using negative resistance to compensate for lossy components in a network.

Another object is to provide a network using a minimum number of negative resistance elements.

Another object is to provide a filter using lossy reactive elements with high dissipation constants whose response is the same as that of a filter using lossless reactive elements.

Another object is to provide a filter using negative resistance in the terminal branches only.

Another object is to provide a mechanical filter using electrical negative resistance devices in its terminal branches.

Still another object is to provide an improved filter using negative resistance to provide gain.

Still another object is to provide an improved array of filters coupled to each other and using a single negative resistance as a termination.

Still a further object is to provide an improved filter using a negative resistance to compensate for its resistive losses.

According to one embodiment of the invention a ladder or filter network incorporating one or more negative resistance is designed by transforming an initially given ladder or filter network, designed by conventional means, into a new filter or ladder network. This transformation is such that the transmission characteristics of the two networks are the same so the selection of the initial network serves to specify the transmission characteristics of the ladder network which is to be designed. Branch dissipation constants are also specified for each branch of the network so as to include in the design the parasitic losses associated with the reactive elements, one or more negative resistances, and other resistances such as the source and load resistances. Following the specification of both the transmission characteristics and the branch dissipation constants, a matrix transformation method as provided by the present invention is used to obtain the element values of a network which realizes these specified quantities.

By using the method taught by the present invention various novel configurations of filter networks can be designed which use only one or two negative resistances internal to the filter or at the input or output terminals, or both, in order to compensate for substantially all the losses of a plurality of reactive elements. Hence, it is now feasible to design various types of filters using this method whereby the losses of each element in the filter can be compensated by a single negative resistance termination at the input or output of the filter. A plurality of filters designed in accordance with this method can be coupled together at their inputs or their outputs, as in multiplex equipment, and a single negative resistance at the coupled terminal will compensate for the losses present in the complete filter bank. It is also feasible by practice of the present invention to compensate for the losses of the elements within a mechanical or thin-film filter, or an array of these filters by negative resistance placed at the terminals of such a filter or filter array. The filter or filter array can be designed to provide gain.

Other objects, aspects and features of the invention will be apparent from the following description with reference to the following figures in which:

FIGURE 1*a* is a circuit diagram of a lowpass ladder network or filter.

FIGURE 1*b* is a circuit diagram of a lowpass filter which is the dual of FIGURE 1*a*.

Figure 1A:
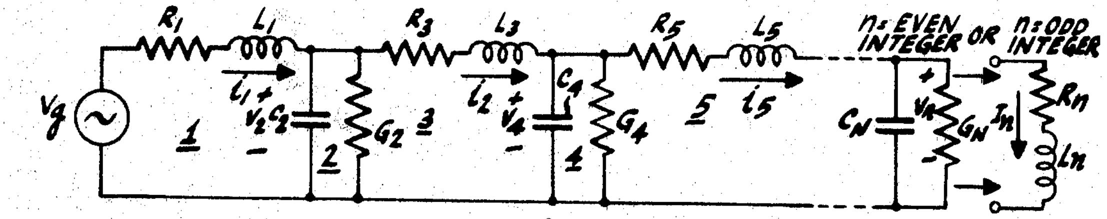
Figure 1B:
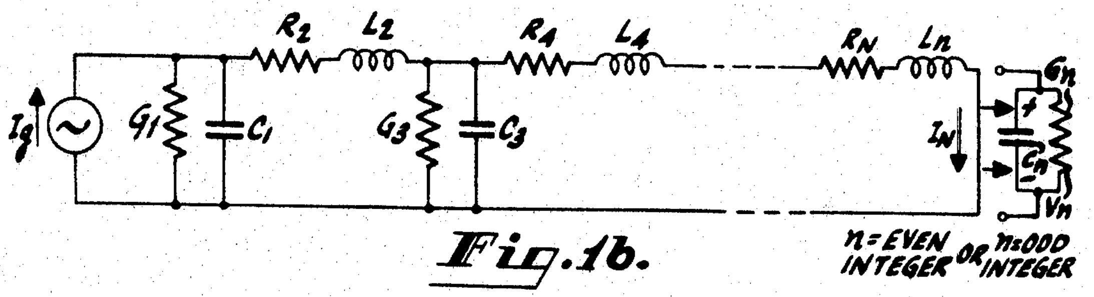

If reference is made to FIGURE 1*a*, there is shown a conventional lowpass filter or ladder network. As is shown in the figure, each series branch such as branch 1, 3, 5, and so on, consists of a resistor and inductor such as $R_1$ and $L_1$ connected in series. Each shunt branch such as branches 2, 4, and so on, consists of a capacitor and a conductance such as $C_2$ and $G_2$ connected in parallel. Networks, as in FIGURE 1*a*, consists of a plurality of branches similar to those shown. A voltage source designated as $V_g$, which may be an oscillator, a receiver, or a source of modulated signals, is connected in series with branch 1. The component values in each branch determine the desired frequency response. The free end of inductor $L_5$ is shown unterminated and a dashed line appears between this point and another branch comprising a capacitor $C_n$ and a conductance $G_n$ when $n$ is even, or an inductance $L_n$ and resistance $R_n$ when $n$ is odd. This dashed line is included to show that the network of FIGURE 1*a*, is not limited to the number of branches shown and could contain a plurality of similar branches thereby forming a more elaborate network. The network shown in FIGURE 1*b* is the dual of the network of FIGURE 1*a*. It is well known that a ladder network composed of reactive and resistive components has a dual. The dual of a network possesses the same response as the original. It is also well known that a transformation of the frequency variable can be used to obtain highpass, bandpass, and bandstop networks and networks with multiple passbands and stopbands using the basic lowpass network shown as a prototype. Hence the methods to be described are applicable to the design of such network configurations as well.

The description of the method of design will now be described for the case of the lowpass network.

*Correspondence of ladder network design and matrix transformation problems*

Figure 2:
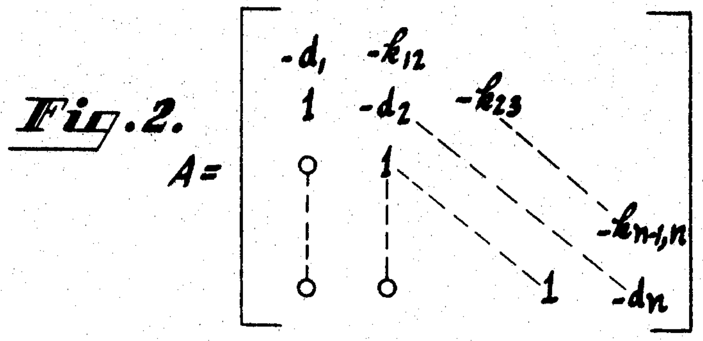
FIGURE 2 is a representation of a network matrix, A, of order N.

A network matrix, A, of order $n$, where $n$ is any positive integer, is defined herein as that shown in FIGURE 2. A description of the use and application of matrices to electrical circuits can be found in the text entitled "Circuits Matrices and Linear Vector Spaces," by L. Huelsman, McGraw-Hill (1963). The network matrix, A, of FIGURE 2 corresponds to the ladder networks shown in FIGURES 1*a* and 1*b*. The entries on the main diagonal of A are the negatives of the branch dissipation constants defined as $$d_i = R_i / L_i \qquad (1a)$$

or $$d_i = G_i / C_i \qquad (1b)$$

where in Equation 1*a*, branch $i$ is a series branch, and $d_i$ is the dissipation constant of this series branch. In Equation 1*b*, branch $i$ is a shunt branch, and $d_i$ the dissipation constant of this shunt branch. The entries on the superdiagonal are the negatives of the coupling constants, $k_{i,\ i+1}$, defined as $$k_{i,\ i+1} = \frac{1}{L_i C_{i+1}} \qquad (2a)$$

or $$k_{i,\ i+1} = \frac{1}{C_i, L_{i+1}} \qquad (2b)$$

In Equation 2*a*, branch $i$ is a series branch, and in Equation 2*b* branch $i$ is a shunt branch. The constant, $k_{i,\ i+1}$, is the coupling constant of branches $i$ and $i+1$. The only non-zero entries of A are those on the main diagonal and the two bordering diagonals.

It is seen that a network and its dual such as shown in FIGURES 1*a* and 1*b* have associated with them a unique network matrix, A, whose entries are given by Equations 1*a*, 1*b*, 2*a*, and 2*b*. The following converse statement is true: a unique class of ladder networks corresponds to a given network matrix if none of the superdiagonal entries, $-k_{i,\ i+1}$, is zero. The class consists of the network (with arbitrary impedance level) and its dual formed by arbitrarily specifying one $L_i$ or $C_i$ and determining the remaining L's and C's from the superdiagonal entries of A and the R's and G's from the main diagonal entries of A. If a superdiagonal entry of A is equal to zero, a network class does not exist because an inductance or capacitance of infinite value is thereby implied.

The $n$ eigenvalues of the matrix A can be shown by induction to be the same as the $n$ eigenvalues of the corresponding ladder network. An eigenvalue of a matrix, A, is any value of a scalar, $\lambda$, such that the equation shown below is satisfied for some vector, $x$:

$$Ax = \lambda x$$

An eigenvalue of the ladder network 1*a* is a value of the frequency variable, $p$, such that nonzero branch variables, $i_1$, $v_2$, $i_3$, $v_4$, and so on, can exist with source $V_g$, equal to zero. In general, $p$, will be a complex number. Because of the equality of the matrix and network eigenvalues, the frequency variable will also be denoted $\lambda$ below. This set of $n$ eigenvalues will be denoted $\{\lambda_i\}$, and it is understood that all $n$ eigenvalues are included in the set even though their values might not be distinct; for example $\lambda_i$ could be equal to $\lambda_j$ for values of $i$ not equal to $j$ where $i$ and $j$ are positive integers.

Two network matrices which have the same set of eigenvalues can be shown to be similar (i.e. in the mathematical sense). This is true, even when the eigenvalues are not all distinct, because network matrices have the property of being cyclic. This property is discussed in the book, "Vector Spaces and Matrices," by Thrall and Tornheim, Wiley (1957). Ladder networks having the same set of eigenvalues are equivalent in their transmission characteristics, except for a scale factor, and they will be denoted equivalent ladder networks. Network matrices of equivalent ladder networks are similar, and, conversely, when ladder networks exist which correspond to similar network matrices, they are equivalent.

These conclusions lead to the following method of designing ladder networks by performing similarity transformations upon network matrices. A network matrix, $A_1$, is determined from Equations 1 and 2 corresponding to the initially given ladder network having the specified transmission characteristics. The next step of the design is to specify the branch dissipation constants, $d_i$, of the desired network; this step also specifies the main diagonal of a new, network matrix, $A_2$, which is to be determined. The next step is to calculate the entries on the superdiagonal of the new, network matrix, $A_2$, so that this matrix is then completely determined. This completes the transformation of $A_1$ into $A_2$. The entries on the superdiagonal of $A_2$ are the negatives of the coupling constants, $k_{i,\ i+1}$, of a new network. The new network is then calculated from the specified $d_i$ and the calculated $k_{i,\ i+1}$, and it has both the specified transmission characteristics and the specified branch dissipation constants. A more detailed description of the methods utilized will now be given.

*Initially determining a network matrix*

The first step of design is to determine a network matrix, $A_1$, which would be of the form shown in FIGURE 2, corresponding to an initially known ladder network which has the desired transmission characteristics. The initially known network can be determined by conventional means because it is used only as an intermediate step in design and does not have to meet the specifications on branch dissipation constants. Therefore, the initial network can be determined by the well-known methods of insertion-loss synthesis or image-parameter design.

Tables of element values are available which can be used to determine initial networks having amplitude or delay versus frequency characteristics which give maximally-flat or equal-ripple approximations to a constant within the passband. The book, "Network Analysis and Synthesis," by L. Weinberg, McGraw-Hill, 1962, contains tables of element values, and it also describes ladder network synthesis techniques which can be employed when other characteristics, not given by the tables, are desired. Symmetrical and antimetrical networks can not be conveniently transformed by the method to be described, so initial networks will most often be singly-terminated or unequally-terminated rather than being equally-terminated.

Figure 3:
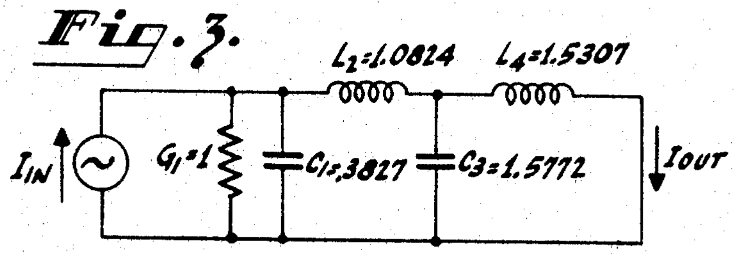
FIGURE 3 is a circuit diagram of a singly terminated network with a maximally flat amplitude response.

The dissipation and coupling constants of the initial network are determined using Equations 1 and 2, and the initial matrix, $A_1$, is then formed as indicated in FIGURE 2. For example, a singly-terminated network with maximally-flat amplitude response, whose element values are given, in normalized form, in the reference book by L. Weinberg, p. 604, is shown in FIGURE 3. The corresponding $d_i$ and $k_{i,\, i+1}$ are $$d_1=2.6131,\ d_2=d_3=d_4=0$$

$$k_{12}=2.4141,\ k_{23}=.5858,\ k_{34}=.4142 \qquad (3)$$

from which the initial matrix, $A_1$, shown below, is obtained:

$$A_1=\begin{bmatrix} -2.6131 & -2.414 & & \\ 1 & 0 & -.5858 & \\ & 1 & 0 & -.4142 \\ & & 1 & 0 \end{bmatrix} \qquad (4)$$

This example will be continued below.

*Specifying branch dissipation constants*

The sum of the main diagonal entries of a matrix is a constant, which is known to be equal to the sum of the eigenvalues. Corresponding to this property of matrices is the following property of ladder networks:

$$\sum_{i=1}^{n} d_i = -\sum_{i=1}^{n} \lambda_i = s \qquad (5)$$

where the $d_i$ are the branch dissipation constants, the $\lambda_i$ the eigenvalues, and $s$ is the constant. This constant, $s$, is the same for all equivalent ladder networks because they have the same eigenvalues, so both the initial and final networks will have the same value of $s$. The specification of the $d_i$ can be done as indicated below so as to satisfy the constraint indicated in Equation 5.

Figure 4:
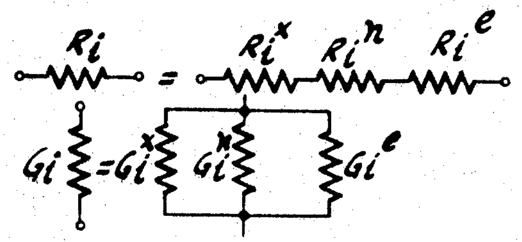
FIGURE 4 is a circuit diagram of a typical branch resistance or conductance used to explain the method employed in the invention.

The resistance in each of the branches of the networks shown in FIGURES 1*a* and 1*b* could consist of several individual parts. For purposes of illustration these parts could be as shown in FIGURE 4. Hence a resistance, $R_i$, or a conductance, $G_i$, may be represented by a plurality of resistors in series or conductances in parallel whose combined values are equal to $R_i$ or $G_i$. The branch dissipation constant of branch $i$ consists of three corresponding parts, i.e.

$$d_i=d_i^x+d_i^n+d_i^e \qquad (6)$$

The part, $d_i^e$, is due to the parasitic loss of the reactive element $L_i$ or $C_i$, the part, $d_i^n$, is that due to a possible negative resistance device in branch $i$, and $d_i^x$ would be that due to the remaining resistance which could include that of the source, load, or any other external devices present in branch $i$. The term resistance is used here and elsewhere in its usual sense to include both $R_i$ and $G_i$, as well as restrictively, to refer only to $R_i$ when the term conductance is also used to refer to $G_i$. The values of the $d_i^n$ are negative. The sum, $s$, of the $d_i$ can be represented in a corresponding manner as the sum of three parts, $$s=s^x+s^n+s^e \qquad (7)$$

Each element dissipation constant, $d_i^e$, can be determined in advance of design because, to a good approximation, such constants are determined by the physical size of the reactive elements and the quality of material used to fabricate them and not by its electrical value. The specification of the $d_i^e$ for all the branches is thus made on the basis of such considerations as the desired size, weight, cost, and temperature performance of the network. In this design method, one may specify inexpensive components of small size instead of high quality units which are normally used in filter work. The individual $d_i^e$ can have diffierent values as required to satisfy the above considerations. The specification of the $d_i^x$ and $d_i^n$ is made so that the constraint of Equation 5 is satisfied. The two sums $s^x$ and $s^n$, must satisfy the relation $$s^x+s^n=s-s^e \qquad (8)$$

which is obtained from (7). There is considerable latitude in how the individual quantities $s^x$ and $s^n$ are specified so that their sum satisfies Equation 8. If the elements' losses are small so that $s^e$ is small, and if transducer gain is not desired, it is possible to avoid using negative resistance so that $s^n$ could be zero. However, it is often desirable to minimize size, weight, or cost of the reactive elements, and in these cases $s^e$ is large, often exceeding $s$, so that one or more negative resistance devices will have to be employed. In these cases $s^n$ could be specified to be equal to $-s^e$ and then $s^x=s$, from Equation 8. This method of specification is only suggested as an example because other possibilities, which satisfy Equation 8, are possible and might be better in regard to obtaining transducer gain, providing more convenient element values, minimizing sensitivity of response to element variations, and improving convergence of the transformation method to be described.

There is also considerable latitude in the manner in which the quantities $s^x$ and $s^n$ are apportioned among the $d_i^x$ and $d_i^n$. Economy would usually dictate that only one or two $d_i^n$ be nonzero, and the system requirements will usually determine if both source and load resistance are necessary so that $d_1^x$ and $d_n^x$ are nonzero and if other nonzero $d_i^x$ are necessary. As an example, $d_1^x$ could be equal to $d_n^x$ and all other $d_i^x$, $i \neq l$ or $n$, could be zero, and one $d_i^n$, say $d_n^n$, could be nonzero. Considerations such as previously discussed with regard to specifying $s^x$ and $s^n$ might dictate better choices for the $d^{ix}$ and $d_i^n$. It is significant and useful that this method of design provides considerable flexibility in these specifications, because new applications for networks are made possible that were not heretofore possible. Hence it is now possible to design a plurality of networks each having a different pass band and to compensate the plurality of reactive elements in these networks with a single negative resistance. This technique allows one to realize specified transmission characteristics using lossy reactive components just as these same characteristics would be realized using lossless reactive components. Hence the filter using the lossy components designed according to the method of this invention responds as if it were fabricated from lossless components. It is also possible to design very large networks which utilize a single negative resistance to compensate for all losses of said reactive elements.

*Similarity transformation of network matrices*

The method will now be described of transforming one network matrix into another similar, network matrix so that the main diagonal of the latter matrix has for its entries the negatives of the specified branch dissipation constants, $-d_i$. The transformation is performed iteratively so that a sequence of network matrices (and a sequence of ladder networks) is obtained. Each $d_i$ is changed during the first $m$ iterations by a constant amount, $\Delta d_i$, until, at the end of iteration $m$, the main diagonal will have the desired entries and the corresponding network the desired dissipation constants.

Figure 5:
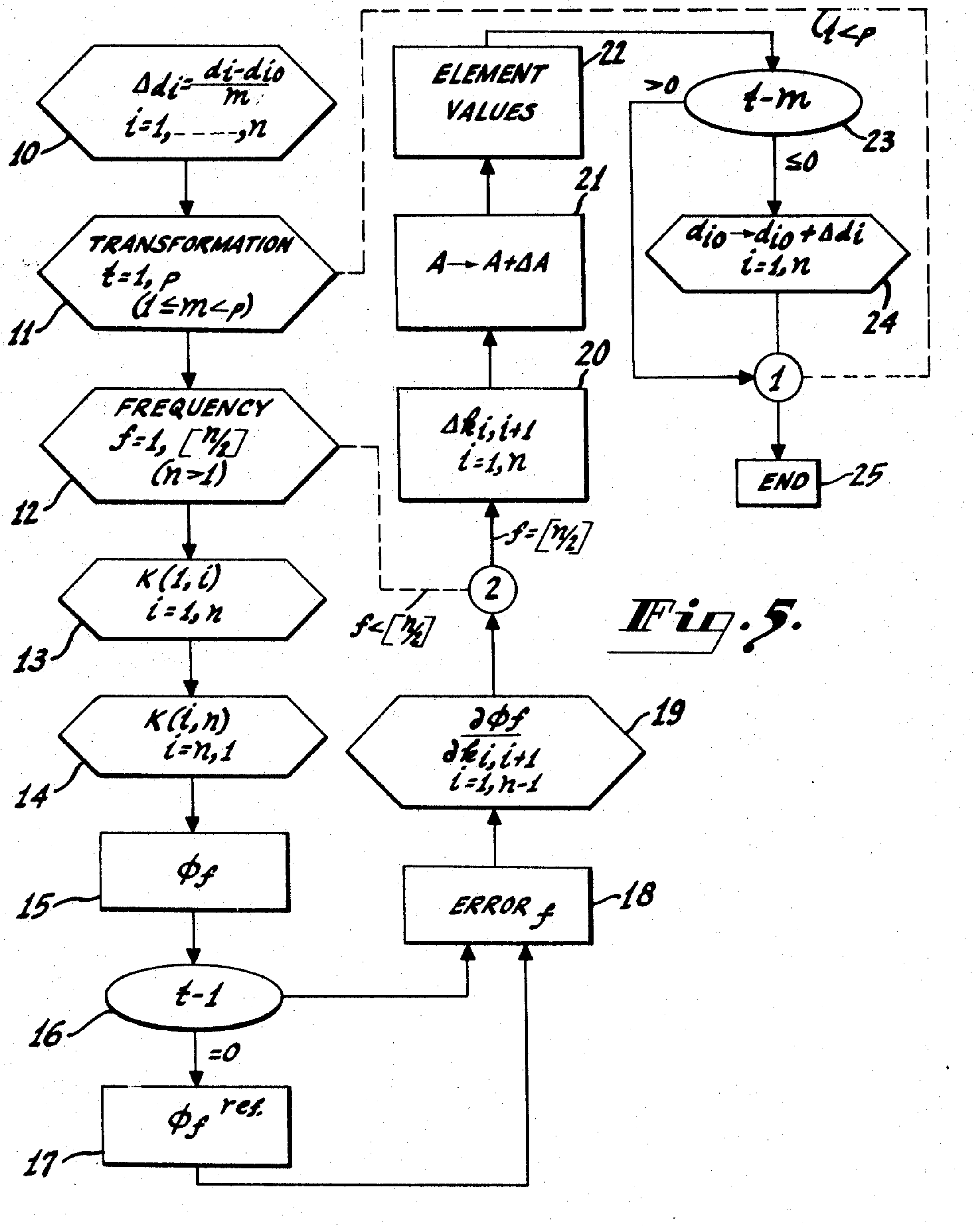
FIGURE 5 is a flow chart of the method used to calculate network element values according to the method of the present invention.

The basis of the method is to require that the characteristic function of A, $\phi(\lambda)$, remains unchanged from iteration to iteration. The characteristic function of a matrix, A, is defined to be determinant, $|\lambda I-A|$, where I is the unit matrix, which has for its only entries plus 1's on the main diagonal. This insures that the new matrix, $A+\Delta A$, will be similar to A, because of the previously mentioned cyclic property of network matrices. $\varphi(\lambda)$ has $n$ parameters associated with it which must not change if it is to remain constant. Specifying that the sum of its mentioned cyclic property of network matrices. $\phi(\lambda)$ has $n-1$ independent conditions to be satisified for the $n$ parameters, and therefore $\phi(\lambda)$, to be constant. These conditions are used to determine the $n-1$ unknown super-diagonal entries of each new matrix, A, formed at each iteration. The method is best described in detail by reference to the block diagram shown in FIGURE 5.

*Flow chart for calculations*

The desired branch dissipation constants are denoted $d_i$, and the initially given branch dissipation constants are denoted $d_{io}$. Increments, $\Delta d_i$, are calculated as shown in block 10 of FIGURE 5, where $m$ is the number of times the branch dissipation constants are to be incremented so that they change in equal increments from $d_{io}$ to $d_i$. For example, $m$ is often chosen to be from 5 to 10.

Block 11 indicates the beginning of the transformation loop. All the subsequent blocks through block 24 are included in this loop. The dotted line indicates the closing of the loop. The specified number of transformations is $p$, which is greater than $m$ (often by 3 to 5), which in turn is equal to or greater than 1. When the loop operations have been performed $p$ times, the next operation following the loop is performed.

The first operation within the transformation loop is the beginning of a frequency loop as indicated in block 12. All subsequent blocks through block 19 are included in this loop, and a dotted line indicates the closing of this loop. This loop is nested within the transformation loop so the operations in it will be performed $[n/2]$ times each transformation, where $[n/2]$ equals $n/2$ or $(n-1)/2$ as $n$ is even or odd respectively, and $n$ is an integer greater than 1. A set of $[n/2]$ independent, complex reference frequencies, $\lambda_f$, are specified. These frequencies will be independent if they are all distinct and none are complex conjugates of the others.

The next two blocks 13 and 14 indicate iterative evaluation of the continuants, K(1, $i$) and K($i$, $n$). These continuants are principal cofactors of the matrix $[\lambda I-A]$. The book, "A Treatise on the Theory of Determinants," by T. Muir, Dover Publications, 1960, gives a discussion of continuants. The next block 15 is the evaluation, at frequency $f$, of the characteristic function of A, $\phi=|\lambda I-A|.\phi$ is the continuant K(1, $n$). Although it has been evaluated in the previous two blocks 13 and 14, the following expression, given in the referenced book by Muir, is used to evaluate $\phi$, for greater numerical accuracy:

$$\phi=K(1,n)=K(1,r)K(r+1,n)+K(1,r-1)K(r+2,n)k_{r,\,r+1}$$

where $r=[n/2]$. This function will be complex in general.

The next block 16 indicates that, during the first transformation when $t=1$, the following block 17 is included in the loop, and, for higher values of $t$, it is bypassed. When $t=1$, a reference value of $\phi$ for frequency $f$, $\phi_f^{ref}$, is determined as follows:

$$\phi_f^{ref}=\phi_{f_{t=1}} \quad (10)$$

The values specified as references here, will be the values that the function, $\phi$, of the final matrix, $A_2$, assumes. Therefore, $A_2$, will have the same function, $\phi$, as $A_1$, and the two matrices will be similar, and the initial and final networks will have the same transmission characteristics as desired.

The next block 18 indicates the calculation of the error that exists in $\phi_f$, of the current matrix, at frequency $f$. This error is defined and calculated by the following expression:

$$\text{Error}_f=\phi_f^{ref}-\phi_f \quad (11)$$

Subsequent calculations have the objective of reducing these errors to zero for all $f$ frequencies.

The next block 19 indicates the iterative calculation of the partial derivatives of $\phi_f$ with respect to the coupling constants, $k_{i,\,i+1}$. The following expression, given in the referenced book by Muir, employs the previously determined continuants for this purpose:

$$\frac{\partial\phi}{\partial k_{i,\,i+1}}=K(1,i-1)K(i+2,n) \quad (12)$$

It is seen that the number of calculations at each frequency for the partial derivatives with respect to all $k_{i,\,i+1}$ is proportional to $n$, rather than $n^2$, as would be the case if the $k_{i,\,i+1}$ were varied one at a time and $\phi_f$ recalculated each time. This calculation is the last in the frequency loop, and, when $f=[n/2]$, the calculations proceed past junction 2 to the next block 20.

Block 20 indicates that the $\Delta k_{i,\,i+1}$ are determined simultaneously. This is done by solving a system of $n-1$ linear equations in the unknowns, $\Delta k_{i,\,i+1}$. A pair of equations is formed, for each frequency, corresponding to the real and imaginary parts of the following expression:

$$\sum_{i=1}^{n-1}\frac{\partial\phi}{\partial k_{i,\,i+1}}\Delta k_{i,\,i+1}=-\text{Error} \quad (13)$$

The first $n-1$ of these equations are solved for the $\Delta k_{i,\,i+1}$.

A new matrix is then formed, as indicated in the next block 21, by adding the increments, $-\Delta k_{i,\,i+1}$, to the main diagonal of the current matrix. The element values of the corresponding new network are then calculated as indicated in the following block 22.

The next block indicates a decision based upon whether $t$ exceeds $m$, and, if it doesn't, the main diagonal is incremented as indicated in the following block 24; otherwise block 24 is bypassed. If $t$ is less than $p$, the transformation loop starting at block 11 will be repeated; otherwise, the problem is at an end as indicated in the final block 25.

An exceptional situation, which can occur, is that the $n-1$ equations are dependent and the $\Delta k_{i,\,i+1}$ can not be accurately determined in block 20. This situation can be detected by observing if the determinant of the coefficients is zero or very small. If so, and if the independence of the $[n/2]$ frequencies has been verified, the current matrix, A, or the current network may be found to be symmetrical or otherwise restricted so that the number of independent $\Delta k_{i,\,i+1}$ is less than $n-1$. It is usually satisfactory and most convenient to change the initial network or the specified $d_i$ in order to avoid this problem. If $t$ is equal to or less than $m$, it may be sufficient to set the $\Delta k_{i,\,i+1}$ equal to zero and to proceed, because the network could be changed sufficiently in block 24 so that the problem does not reoccur.

EXAMPLE

By way of example, the matrix, $A_1$, of Equation 4 was transformed into a new matrix, $A_2$, with the specifications that $A_2$ be similar to $A_1$ and that $$d_1=2.6131,\ d_2=.2,\ d_3=.5,\ d_4=-.7. \quad (14)$$

The resulting new matrix, $A_2$, which has the negatives of the $d_i$ on its main diagonal and which is similar to $A_1$, is shown below:

$$A_2=\begin{bmatrix} -2.6131 & -2.1593 & & \\ 1 & -.2000 & -.5482 & \\ & 1 & .5000 & -1.0968 \\ & & 1 & +.7000 \end{bmatrix} \quad (15)$$

It was also specified that $d_1$ and $d_4$ be apportioned as follows:

$$d_1=d_1^x+d_1^e=2.1131+.5 \quad (16)$$
$$d_4=d_4^e+d_4^n=.2-.9$$

Figure 6:
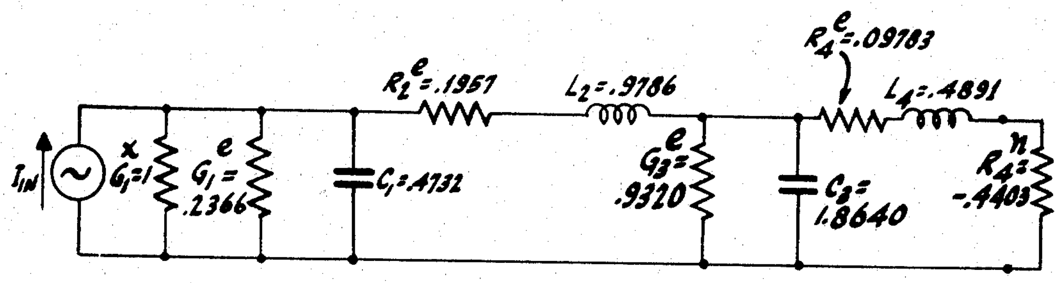
FIGURE 6 is a circuit diagram of one embodiment of a network designed according to this invention.

Thus, it is seen that the element dissipation constants of both $C_1$ and $C_3$ were .5, and those of $L_2$ and $L_4$ were .2. It was also specified that $G_1^x=1$, and, corresponding to those specifications and $A_2$ of Equation 15, the network of FIGURE 6 was obtained as follows: knowing $G_1$ and $d_1$, $C_1$ was obtained from Equation 1. $L_2$, $C_3$, and $L_4$ were than obtained from Equation 2 and the known $k_{1,\,1+1}$, and the network resistances and conductances were obtained from Equations 1 and 1*b*. This network is equivalent to that of FIGURE 3 and, in addition, has specified branch dissipation constants. The element values indicated in FIGURES 3 and 6 are normalized, and they can be unnormalized by known methods described in the referenced book by L. Weinberg to give a filter of different impedance level and bandwidth. The important point of this example is that the filter shown in FIGURE 6 will have the same, prescribed, response as the filter shown in FIGURE 3 which has lossless reactive components. This response is obtained using relatively lossy coils and capacitors whose losses in turn are compensated for by placing the negative resistance $G_4$, at the termination of the filter.

Figure 7:
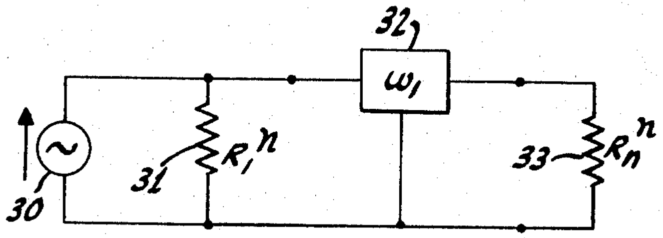
FIGURE 7 is a circuit diagram of a further embodiment according to this invention.

FIGURE 7 shows a block diagram embodiment of a filter circuit which may be implemented using this invention. Numeral 30 refers to a source of signal. One terminal of source 30 is coupled to a resistor 31 $R_1^n$, which is a negative resistance. The same end of resistor 31 couples to the input terminal of a network 32, which can be a mechanical network, a network with thin-film or integrated-circuit components, or a network with lossy coils and capacitors designed according to these methods. The opposite end of resistor 31 couples to the other end of the source 30 and a common potential point of network 32. The network 32 is also labelled $\omega_1$, to indicate that the filter circuit of FIGURE 7 is a filter with center frequency, $\omega_1$. The output terminal of the network 32 is coupled to a terminal of a negative resistance element 33, $R_n^n$. The opposite terminal of resistor 33 is in common with the common potential point of the filter 32 and the opposite terminal of the source 30. Therefore, there is a negative resistor 31 at the input and a negative resistor 33 at the output of the network. This would require two negative dissipation constants appearing in a diagonal of the final matrix and is easily implemented by using the above techniques. The terminal branches of network 32 could be either series or shunt. Hence a mechanical filter, which is designed by using electrical analogs, inductance and capacitance, for mechanical counterparts, could be designed using the method described and the losses of this device could then be substantially compensated by the use of the calculated negative resistances, as 31 and 33. These negative resistances could precede and follow the electrical-mechanical transducers and could be electrical, thereby avoiding the problem of making mechanical negative resistances. Network 32 could also be a thin film network. Thin-film and integrated-circuit coils are known to have high losses; however, using this method the coils employed in the network can have high losses. Their dissipation constants will be known and the negative resistances 31 and 33, as calculated, will substantially compensate for the losses.

By utilizing the method described, a plurality of filters can be designed so that one negative resistance compensates for all the losses in the plurality of filters. The filters could be included in an array. If reference is made to FIGURE 8, such an array is shown. Each of the networks shown in block form at 35, 36, 37 and 38, is a bandpass network, which could be obtained, for example, by transforming a lowpass prototype, such as shown in FIGURE 6, into a bandpass network. The negative resistance occurs in branch 1 of the prototype. Branch 1 is often a series branch to minimize interaction between the filters. Reference numeral 34 is a negative resistance circuit designated as $R_1^n$. Such circuits to produce negative resistance utilizing transistors, tunnel diodes, tetrodes and so on are well known in the art and not considered part of this invention. One terminal of the negative resistance device 34 is coupled to the common inputs of a group of networks, in this case four, designated as 35, 36, 37 and 38. These networks 35–38 are designed in accordance with the method described and the value of negative resistance 34, needed is thusly obtained. Hence all the losses inherent in the reactive elements comprising filters 35 to 38 are compensated for by the single negative resistance element 34. Such filter arrays are used extensively in multiplex equipment, frequency synthesizers and so on.

Figure 8:
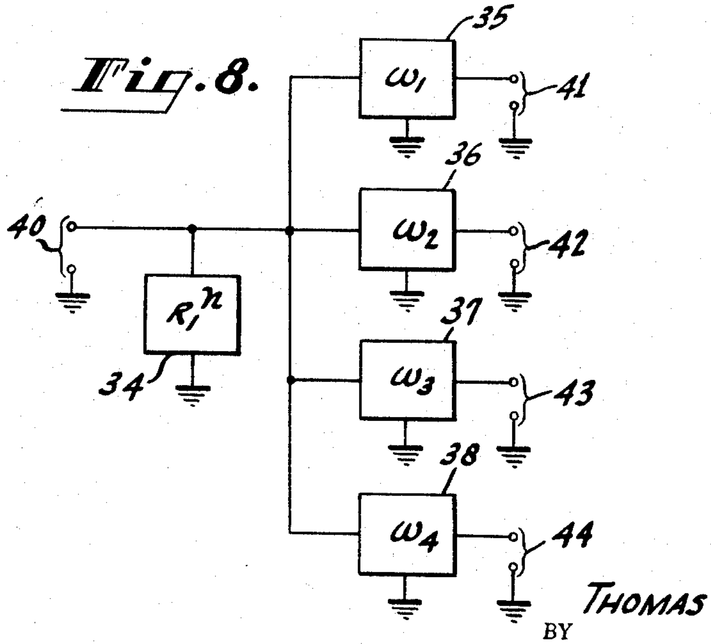
FIGURE 8 is a block diagram of a filter array according to this invention.

FIGURE 8 shows the input terminal 40 located between the common point of filters 35, 36, 37 and 38 and the negative resistance element 34. The outputs 41 to 44 are shown as taken from the respective filters 35 to 38. This arrangement could be used in a multiplex receiver or a frequency synthesizer. However the input and output terminals can be interchanged and a configuration similar to a multiplex transmitter filter array is obtained.

The invention described herein is particularly suited to the implementation of thin-film or integrated-circuit filter circuits and circuits having mechanical components. It is known in the art that thin-film and integrated-circuit reactances are inherently lossy and consequently have large dissipation constants. High quality filters can be built using integrated-circuit or thin-film reactive elements according to the method and apparatus described herein, whereby the losses are compensated for by terminating the filter in the calculated negative resistance. The negative resistance circuit can be fabricated, for example, from a thin film transistor network, diode, or some other suitable configuration capable of deposition as a thin film or an integrated network. Alternatively, because the negative resistance appears at the terminals, it may be associated with circuitry external to the filter. This is advantageous because different fabrication techniques can then be employed for the reactive elements and the negative resistance. This advantage is particularly applicable when mechanical reactive elements are employed.

What is claimed is:

1. An *n* branch three terminal ladder network first filter incorporating lossy reactive elements having the same specified preselected frequency characteristics and insertion loss as a given *n* branch three terminal ladder network ideal second filter incorporating substantially lossless known reactive elements when both said first and second filters have the same specified impedance terminations, where *n* is a predetermined integer at least equal to three so that each filter includes a first terminating branch at one end thereof adapted to have a first specified impedance termination thereat, a second terminating branch at the other end thereof adapted to have a second specified impedance termination thereat, and at least one additional branch intermediate said first and second terminating branches; said first filter being characterized by each individual branch thereof having its own specified positive dissipation constant which is substantially due to the lossy reactive element of that branch and by at least one of said terminating branches only incorporating a given negative resistance element to provide that terminating branch with a negative dissipation constant of a certain value such that the total negative dissipation constant provided by both said terminating branches is substantially equal to the sum of said positive dissipation constants of all said branches, and wherein each terminating branch includes a second positive dissipation constant determined by the specified impedance termination thereat, whereby there is formed a set of *n* resultant dissipation constants each of which is associated with a separate branch of said filter with the resultant dissipation constant of a terminating branch being the algebraic sum of all the dissipation constants associated therewith and the resultant dissipation constant of an additional branch being solely said first-mentioned positive dissipation constant, said first filter being further characterized by each branch having a certain particular value of reactance which is individual to that branch, said certain particular value of reactance of any branch being individually determined by the value of the known respective reactances associated with the respective branches of said given second ideal filter and the respective resultant dissipation constants of said separate $n$ branches of said first filter to provide said first filter with said specified frequency characteristic.

2. The filter defined in claim 1, wherein only one of said terminating branches incorporates a negative resistance element.

3. The filter defined in claim 1, wherein said lossy reactive elements are thin-film elements.

4. The filter defined in claim 1, wherein said lossy reactive elements are integrated-circuit elements.

5. The filter defined in claim 1, wherein said lossy reactive elements are mechanical components.

6. A filter array comprising the combination of a predetermined number of $n_i$ branch three terminal ladder network separate filters each of which incorporates lossy reactive elements, where $n_i$ is an integer at least equal to three, which may be different for each of said separate filters, so that each filter includes a first terminating branch at one end thereof, a second terminating branch at the other end thereof, and at least one additional branch intermediate said input and output terminating branches; a first common terminal and a second common terminal, the respective first terminating branches of all said separate filters being connected in common between said first and second common terminals, a single negative resistance having a certain particular value connected between said first and second common terminals, said filter array being adapted to have a specified common impedance termination for all said separate filters connected between said common terminals and being adapted to have a separate individual specified impedance termination at the second terminating branch of each respective filter thereof; each individual filter of said array having the same specified preselected frequency characteristics as an individual corresponding ideal filter having the same number of branches, which ideal filter incorporates substantially lossless known reactive elements, when both any filter of said array and that ideal filter which corresponds thereto have the same specified impedance terminations, said certain particular value of said negative resistance being such as to compensate for the lossiness of the reactive elements of all the filters of said array and thereby provide an insertion loss for the filters of said array substantially equal to an equivalent array composed of said ideal filters.

7. The filter array defined in claim 6, wherein each filter thereof is characterized by each individual branch thereof having its own specified positive dissipation constant which is substantially due to the lossy reactive element of that branch, said certain particular value of said negative resistance providing a negative dissipation constant which is substantially equal to the sum of said positive dissipation constants of all said branches of all said filters of said array, and wherein each terminating branch of the filters of said array includes a second positive dissipation constant determined by the specified impedance termination thereat, whereby there is formed a set of resultant dissipation constants each of which is associated with a separate branch of each filter of said array with the resultant dissipation constant of said connected-in-common first terminating branches being the algebraic sum of all the dissipation constants associated therewith, the resultant dissipation constant of an additional branch of any filter being solely said first-mentioned positive dissipation constant of that particular additional branch, and the resultant dissipation constant of the second terminating branch of each filter of said array being the algebraic sum of all the dissipation constants associated therewith, said filter array being further characterized by each branch of each filter thereof having a certain particular value of reactance which is individual to that branch, said certain particular value of reactance of any branch being individually determined by the value of the respective known reactances associated with the respective branches of the ideal filter corresponding thereto and the respective resultant dissipation constants of the separate branches of that filter of the array to provide that filter of said array with the specified frequency characteristic of the ideal filter corresponding thereto.

References Cited

UNITED STATES PATENTS

| | | | |
|---|---|---|---|
| 2,273,519 | 2/1942 | Haantjes | 333—80 X |
| 2,274,347 | 2/1942 | Rust et al. | 333—80 X |
| 2,757,342 | 7/1956 | Linvill | 333—80 X |
| 3,187,266 | 6/1965 | Marshall | 333—80 X |
| 3,303,354 | 2/1967 | Carroll | 333—80 X |

FOREIGN PATENTS

| | | |
|---|---|---|
| 278,036 | 9/1927 | Great Britain. |

HERMAN KARL SAALBACH, *Primary Examiner.*

P. L. GENSLER, *Assistant Examiner.*

U.S. Cl. X.R.

333—80, 76